(No Model.) 2 Sheets—Sheet 2.
A. HARRIS.
FEED WATER FILTER.
No. 515,768. Patented Mar. 6, 1894.
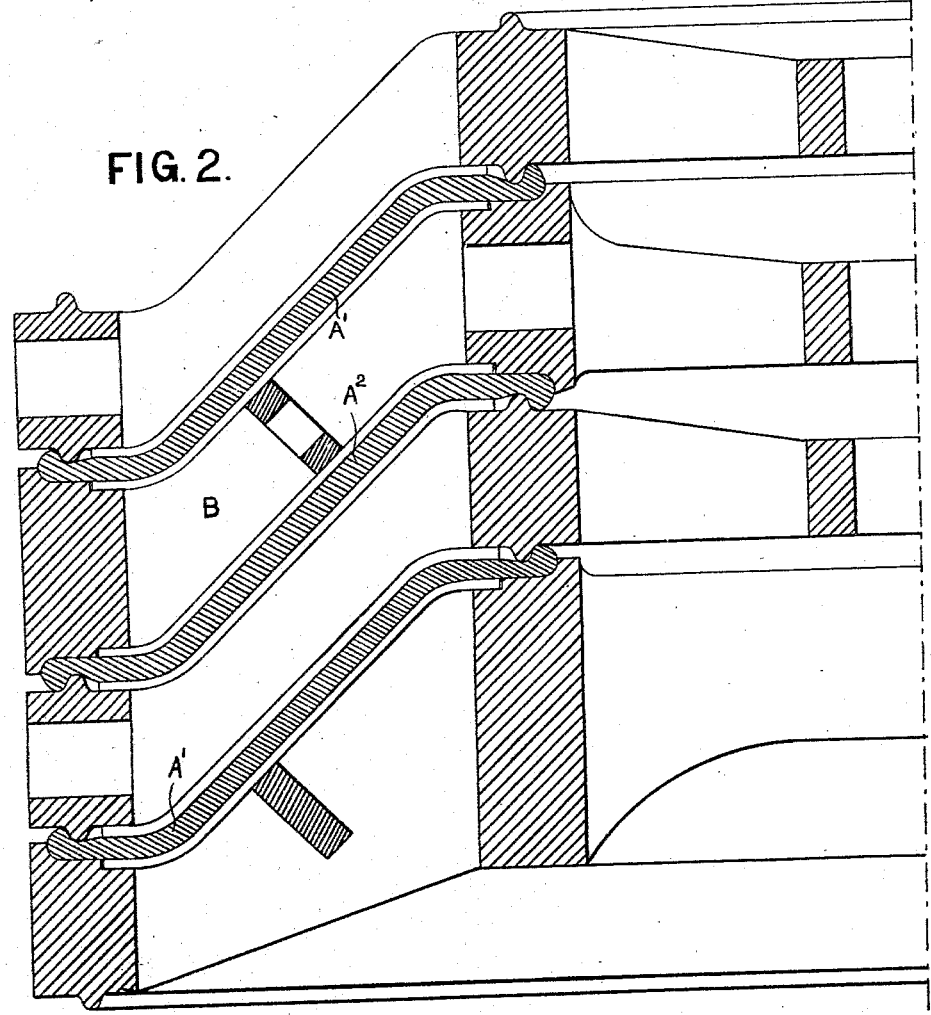
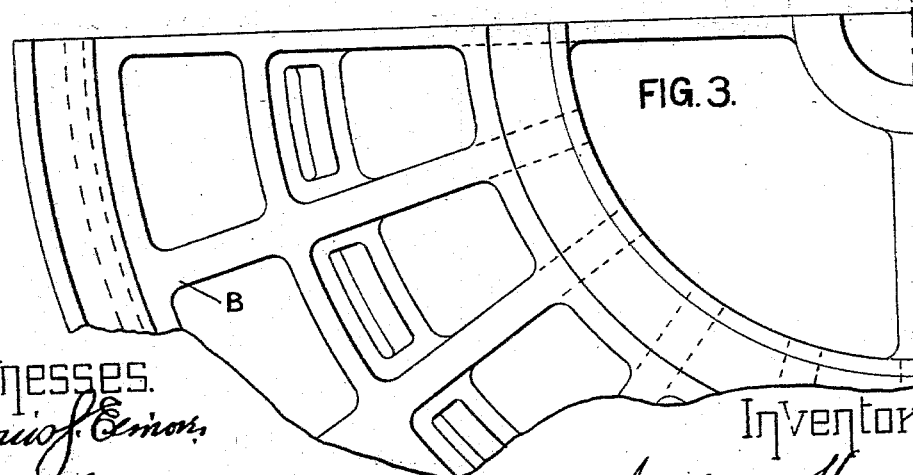

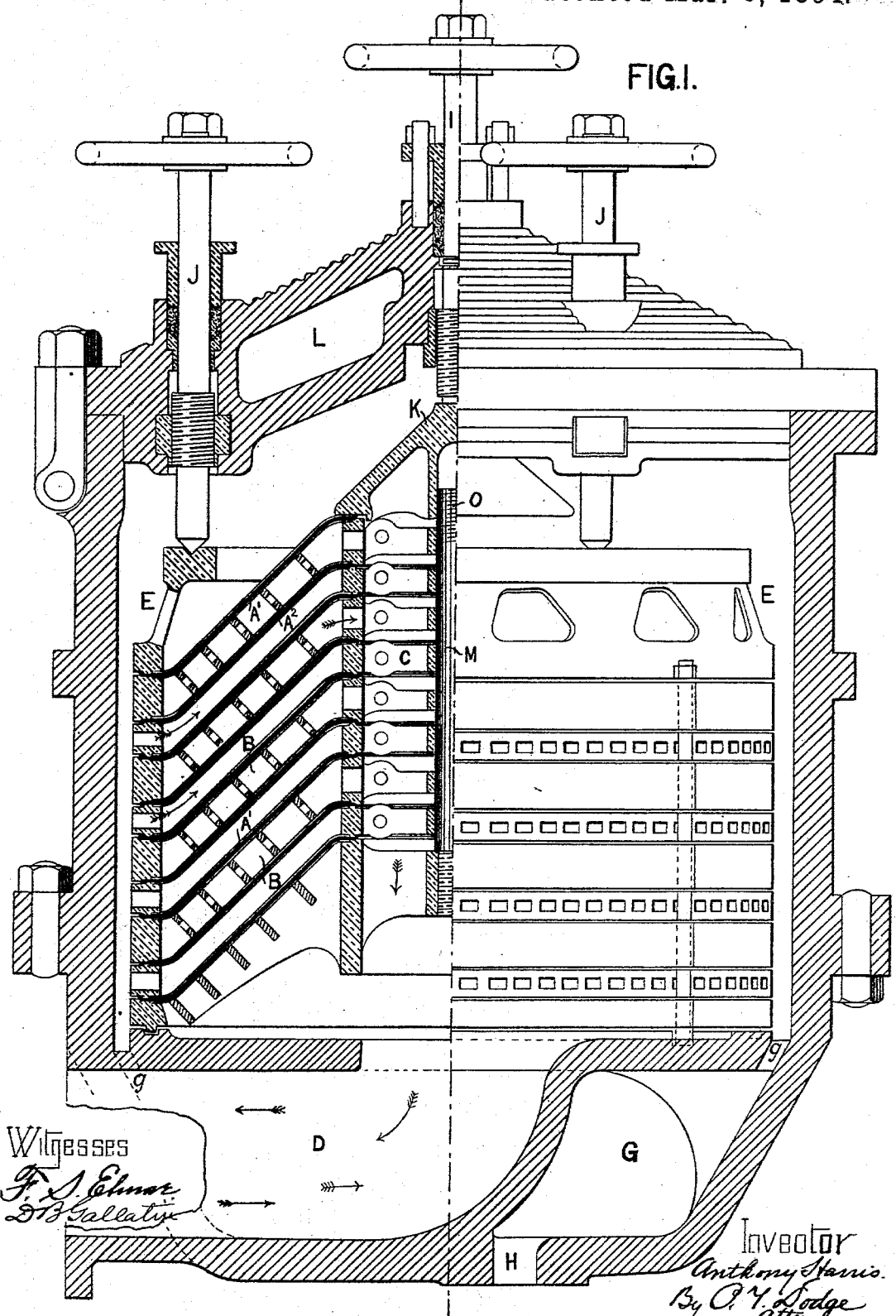

UNITED STATES PATENT OFFICE.

ANTHONY HARRIS, OF MIDDLESBOROUGH, ENGLAND.

FEED-WATER FILTER.

SPECIFICATION forming part of Letters Patent No. 515,768, dated March 6, 1894.

Application filed May 11, 1893. Serial No. 473,867. (No model.) Patented in Italy May 12, 1893, No. 33,986; in Belgium May 15, 1893, No. 104,407, and in France July 25, 1893, No. 229,566.

*To all whom it may concern:*

Be it known that I, ANTHONY HARRIS, a subject of the Queen of Great Britain, residing at Middlesborough, in the county of York, England, have invented certain new and useful Improvements in Feed-Water Filters, (for which I have received Letters Patent in France, No. 229,566, dated July 25, 1893; in Belgium, No. 104,407, dated May 15, 1893, and in Italy, No. 33,986, dated May 12, 1893,) of which the following is a specification.

In working filters for feed water in which a series of flannels have been used as filtering material, I have found that, to effectually remove the coarse and extraneous matters, very large surfaces of filtering material are necessary, and filters for large engines would require to be at least seven feet in diameter when the whole body of water is made to pass through one layer of flannel. Further, I find that, when water passes through a series of flannels one after another, the succeeding flannels after the first become considerably contaminated, and, when the current is reversed to clean the filter, this can be effectually accomplished, but the dirt is to a considerable extent merely transferred backward from the face of one flannel to the back of the next, and no farther. Now my present invention is designed to economize room by using several flannels, each receiving an independent amount of water.

The invention is best described by aid of the accompanying drawings, illustrative of a filter I have actually constructed.

Figure 1 is a transverse section as regards one half through the center of the filter. As regards the other half, it is a side view with part of the shell removed. Fig. 2 is a section, and Fig. 3 a plan of a portion of the frames drawn to a larger scale.

A' A², &c., are flannels. Between each pair of flannels is a perforated grating B, so constructed that the water passing freely between the layers of flannel, as shown in the drawings, cannot penetrate into the interior or delivery side of the filter without passing through a flannel, but is obliged to pass through one layer of flannel into the interior of the perforated grate or cage between two pairs of flannels; the direction of its course is indicated by arrows. By this means, with the exception of the top and bottom, the pressure on the grates is equalized. The water filtering into them on both sides passes through the hollow grate or cage into the central duct C leading to the outlet of the filter D. It is obvious that the process may be reversed and the dirty water led in through the central opening into the cages and out into the chamber E into which, in ordinary course, it enters by a pipe not shown in the drawings. The lower portion of the filter chamber is constructed so as to form a dirt collector G, and is provided with a cleansing valve of any ordinary construction, not shown in the drawings, but fitted to the exit H. The communication from the dirty side of the filter to the dirt chamber is through a series of short channels *g*; therefore, when it is proposed to clean the filtering medium by means of reversing the current of water by opening the sludge valve, the water will pass back through the egress valve up through the central duct C, and dividing portions will go through each flannel and carry the washings through the communication into the chamber E and thence through the channels *g* into the dirt chamber, from whence it will escape through the sludge valve. Between the grating and the flannel, I prefer to place coarse rubber or nickel plated gauze; on these the flannels lie, and to prevent the flannels being displaced when the filter is reversed, similar gauze is provided on the other side of the flannels also and sewed or otherwise attached to the gauze on the opposite side. Instead, however, of the gauze being placed on both sides, the flannel can be sewed or riveted to the gauze or even to the frames. I do not, however, recommend this plan. The various frames are guided into position by means of stem M, which is screwed into the lowest one, as shown. All the frames can be withdrawn together without disturbing their relative position. The joints of the various layers and grates are made water-tight by the pressure of screws J J set up from the outside of the filter and communicated through a perforated bonnet, and the jointing of the layers of the central duct is set up by a central screw I, also from the outside of the casing acting on a close-ended cover K which seals the top of the central duct. These screws are provided with stuffing boxes, as shown.

In this apparatus, the frames are formed as shown of a series of shallow truncated cones opening into the interior central chamber. The spaces between the frames have no admission to the central chamber but have free exit to the outside. The spaces within the frames communicate with a central chamber and thus with the exit. The chamber E is connected with a water supply. The bottom of the outside annular chamber, which is very narrow, is supplied, as already described, with openings g into the dirt channel G. Any dirt that settles in the outside chamber will, by its own accord, gravitate into the dirt chamber, and, when the action of the filter is reversed and the sludge valve opened, the dirty water settling will all drain into the dirt chamber and thus through the sludge valve. The walls of the central chamber and the internal walls of the outside chamber are formed of flanges on the frames themselves, preferably tongued and grooved and having a thin layer of rubber, flannel, or other material between, consequently, when the lid is taken off the filter, the frames can all be taken out, and nothing is left but a simple cast iron box. If, too, the lid be withdrawn, all the frames can be withdrawn together by applying an eye nut to the end of the stem M and hoisting the whole out by means of a hook passing through the eye of the eye nut. When the frames are again applied, they are screwed down tight against the bottom seat by means of the hand wheels and screws, which are preferably four in number, including the center one. The lid of the filter is provided with an air chamber L, so as to equalize the effect on the filter of the pulsations of the pump.

I declare that what I claim is—

1. In a filter an inclosing chamber provided with a removable cover, and having in its lower part a sludge chamber and outlet and a seat for filtering frames, in combination with a series of superimposed annular filtering frames each clothed with upper and lower sheets of filtering material, said frames having passages at one side opening into the spaces between adjacent frames and passages at the opposite side communicating with the spaces between the filtering sheets of the individual frames, the passages at one side being connected with a fluid supply and those at the opposite side with an outlet passage, and means for clamping said frames together.

2. In a filter an inclosing chamber provided with a removable cover, and having in its lower part a sludge chamber and an outlet therefrom, and above said chamber a seat for filtering frames, in combination with a series of superimposed frames each clothed with upper and lower sheets of filtering material, said frames having openings at one side connecting a fluid supply with the spaces between adjacent frames, and openings at the opposite side connecting an outlet passage with the spaces between the filtering sheets of the individual frames.

3. In a filter the combination of an inclosing casing provided with a removable cover and having in its lower part a sludge chamber, an outlet therefrom, a central fluid outlet, and a seat for filtering frames, a series of superimposed annular frames each clothed with upper and lower sheets of filtering material, said frames having openings through their inner walls connecting the spaces between the filtering sheets with the central chamber formed by the frames, and openings at the outside between adjacent frames connecting the spaces between adjacent frames with an exterior fluid passage, and means for clamping said frames together.

4. In a filter the combination of an inclosing casing provided with a removable cover, and having at its bottom a sludge outlet, a fluid outlet, and a seat for filtering frames, a series of outwardly inclining, or cone-shaped, superimposed annular frames each clothed with upper and lower sheets of filtering material, the interior chamber formed by the frames communicating with the fluid outlet of the casing, and a removable cap closing the top of said chamber, the said frames having openings between them connecting an exterior fluid passage with the spaces between adjacent frames, and openings through their inner walls connecting the spaces between the filtering sheets of the individual frames with the said interior chamber and fluid outlet.

In testimony whereof I have signed my name to this specification in the presence of two subscribing witnesses.

ANTHONY HARRIS.

Witnesses:
W. P. THOMPSON,
H. P. SHOOBRIDGE.